(12) United States Patent
Amano et al.

(10) Patent No.: US 7,577,805 B2
(45) Date of Patent: Aug. 18, 2009

(54) USING BANDWIDTH AND CAPACITY PARAMETERS TO CONTROL REMOTE COPY OPERATIONS IN STORAGE SYSTEMS

(75) Inventors: Takashi Amano, Sunnyvale, CA (US); Yuichi Yagawa, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 184 days.

(21) Appl. No.: 10/980,121

(22) Filed: Nov. 1, 2004

(65) Prior Publication Data
US 2006/0095696 A1    May 4, 2006

(51) Int. Cl.
G06F 12/00    (2006.01)
(52) U.S. Cl. .................. 711/161; 711/100; 711/114; 711/162; 707/204
(58) Field of Classification Search ................ 711/162, 711/100, 114, 161; 707/204
See application file for complete search history.

(56) References Cited

U.S. PATENT DOCUMENTS

| | | | |
|---|---|---|---|
| 5,504,861 A * | 4/1996 | Crockett et al. ................ 714/13 |
| 5,640,561 A * | 6/1997 | Satoh et al. .................. 707/202 |
| 6,487,562 B1 | 11/2002 | Mason et al. | |
| 6,671,705 B1 * | 12/2003 | Duprey et al. ................ 707/204 |
| 6,947,956 B2 * | 9/2005 | Olstad et al. ................. 707/200 |
| 7,031,984 B2 * | 4/2006 | Kawamura et al. ........ 707/104.1 |
| 7,062,628 B2 * | 6/2006 | Amano ......................... 711/170 |
| 2003/0079019 A1 * | 4/2003 | Lolayekar et al. ........... 709/226 |
| 2003/0115433 A1 | 6/2003 | Kodama | |
| 2005/0108565 A1 * | 5/2005 | Blea et al. .................... 713/200 |

\* cited by examiner

*Primary Examiner*—Tuan V Thai
*Assistant Examiner*—Zhuo H Li
(74) *Attorney, Agent, or Firm*—Mattingly & Malur, P.C.

(57) ABSTRACT

A system is provided for storage of journal data from a primary site to a secondary site with a predefined quality of service. In one implementation, the primary storage system stores information for updating data stored on the primary disk array in the form of a history of updates made to the data. The primary storage system is configured to transfer this journal information to the secondary storage system. The user can specify the quality of service desired using a variety of measures, for example, a recovery point objective or a recovery time objective. In response, a copy manager within one of the storage systems determines the capacity of the various primary and secondary volumes, and determines the copy rate available, typically dependent upon the bandwidth between the primary and secondary systems. The copy manager then copies journal data to the remote site where it is stored.

20 Claims, 16 Drawing Sheets

| Site | LDEV ID | Capacity [GB] | Port | In Use | Used Capacity [GB] |
|---|---|---|---|---|---|
| P | 00:00 | 100 | - | No | 0 |
|   | 00:01 | 100 | - | No | 0 |
|   | 00:02 | 100 | - | No | 0 |
|   | 00:03 | 100 | - | No | 0 |
|   | ... | ... | ... | ... | ... |
|   | 00:FE | 100 | - | No | 0 |
|   | 00:FF | 100 | - | No | 0 |
|   | 01:00 | 100 | - | No | 0 |
|   | 01:01 | 100 | - | No | 0 |
| S | ... | ... | ... | ... | ... |
|   | FF:FF | 100 | - | No | 0 |

Figure 3a

| Site | LDEV ID | Capacity [GB] | Port | In Use | Used Capacity [GB] |
|---|---|---|---|---|---|
| P | 00:00 | 100 | CL1-A | Yes | 0 |
|   | 00:01 | 100 | CL1-A | Yes | 0 |
|   | 00:02 | 100 | CL1-A | Yes | 0 |
|   | 00:03 | 100 | - | No | 0 |
|   | ... | ... | ... | ... | ... |
|   | 11:0E | 100 | - | No | 0 |
|   | 11:0F | 100 | - | No | 0 |
|   | 11:10 | 100 | CL1-E | Yes | 0 |
|   | 11:11 | 100 | CL1-E | Yes | 0 |
| S | ... | ... | ... | ... | ... |
|   | FF:FF | 100 | - | No | 0 |

Figure 3b

| Journal Group # 133 | Pair # 401 | LDEV ID 302 | | | | Action for Journal Overflow 402 | Threshold of Remaining Capacity for Action for Journal Overflow 403 | Scale of Copy Rate 404 | Comeback Threshold of PJVOL 405 |
|---|---|---|---|---|---|---|---|---|---|
| | | PVOL 135 | PJVOL 136 | SVOL 139 | SJVOL 138 | | | | |
| 1 | 1 | 00-00 | 00-10 | 10-00 | 10-10 | on | 10 GB | 300 % | 2 GB |
| | 2 | 00-01 | — | 10-01 | — | | | | |
| | 3 | 00-02 | 00-2D | 10-02 | 10-2D | | | | |
| 2 | 4 | 01-00 | 01-10 | 11-00 | 11-10 | off | - | - | - |
| | | | — | | — | | | | |
| | | | 01-23 | | 11-23 | | | | |
| 3 | 5 | 02-00 | 02-10 | 12-00 | 12-10 | on | 10 GB | 200% | 3 GB |
| | | | — | | — | | | | |
| | | | 02-2D | | 12-2D | | | | |

Figure 4

| Journal Group # | Used Capacity | Total Capacity |
|---|---|---|
| | ⌐ 501   PJVOL ⌐ 502 | |
| 1 | 0 | 3000 |
| 2 | 0 | 2000 |
| 3 | 0 | 3000 |

Figure 5

| Priority # ⌐601 | Copy Rate ⌐118 | Capacity Rate of JVOL ⌐603 | QoS ⌐604 | |
|---|---|---|---|---|
| | | | RPO ⌐605 | RTO ⌐606 |
| 1 | 100 | P-VOL x 10 | 1 minute | 1.5 minutes |
| 2 | 10 | P-VOL x 20 | 10 minutes | 15 minutes |
| 3 | 4 | P-VOL x 30 | 2 hours | 2 hours |
| 4 | 2 | P-VOL x 40 | 1 day | 1 day |
| 5 | 1 | P-VOL x 50 | 1 week | 7 days |

Figure 6

| Priority # | Copy Rate | Max Capacity per Cycle |
|---|---|---|
| 1 | 100 | 30 MB |
| 2 | 10 | 3 MB |
| 3 | 4 | 1200 KB |
| 4 | 2 | 600 KB |
| 5 | 1 | 300 KB |

Figure 7

| Priority # | Copy Rate | Max Capacity per Second |
|---|---|---|
| 1 | 100 | 250 Mb |
| 2 | 10 | 25 Mb |
| 3 | 4 | 10 Mb |
| 4 | 2 | 5 Mb |
| 5 | 1 | 2.5 Mb |

Figure 7a

| Journal Group # (133) | RPO (605) | Copy Rate (118) | Max Capacity per One Cycle (701) |
|---|---|---|---|
| 1 | 1 minute | 100 | 30 MB |
| 2 | 10 minutes | 10 | 3 MB |
| 3 | 2 hours | 4 | 1200 KB |

Figure 8

| Journal Group # | Max Capacity per One Cycle | Current Capacity per One Cycle |
|---|---|---|
| 1 | 30 MB | 0 MB |
| 2 | 3 MB | 0 MB |
| 3 | 1200 KB | 0 KB |

| Journal Group # | Max Capacity per One Second | Copied Capacity per One Second | Current Bandwidth |
|---|---|---|---|
| 1 | 250 Mb | 200 Mb | 200 Mbps |
| 2 | 25 Mb | 7 Mb | 7 Mbps |
| 3 | 10 Mb | 2 Mb | 2 Mbps |

Figure 9a 133, 701, 901

| Journal Group # | Max Capacity per One Cycle | Current Capacity per One Cycle |
|---|---|---|
| 1 | 30 MB | 10 MB |
| 2 | 3 MB | 3 MB |
| 3 | 1200 KB | 1200 KB |

Figure 9b

| Queue # ~1001 | Journal Group # ~133 | LDEV ID of PJVOL ~302 | Address of Journal Meta Data ~1003 | Capacity of Journal ~1004 | Journal Sequence # ~1005 |
|---|---|---|---|---|---|
| 1 | 1 | 00-10 | 00001 | 1MB | 001-0005086 |
| 2 | 2 | 01-10 | 00001 | 1.5 MB | 002-0000390 |
| 3 | 3 | 02-10 | 00001 | 240KB | 003-0000049 |
| 4 | 1 | 00-10 | 00002 | 1MB | 001-0005087 |
| 5 | 2 | 01-10 | 00002 | 1.5 MB | 002-0000391 |
| 6 | 3 | 02-10 | 00002 | 240KB | 003-0000050 |
| 7 | 1 | 00-10 | 00003 | 1MB | 001-0005088 |
| 8 | 3 | 02-10 | 00003 | 240KB | 003-0000051 |
| 9 | 1 | 00-10 | 00004 | 1MB | 001-0005089 |
| 10 | 3 | 02-10 | 00004 | 240KB | 003-0000052 |
| 11 | 1 | 00-10 | 00005 | 1MB | 001-0005090 |
| 12 | 3 | 02-10 | 00005 | 240KB | 003-0000053 |
| 13 | 1 | 00-10 | 00006 | 1MB | 001-0005091 |
| 14 | 1 | 00-10 | 00007 | 1MB | 001-0005092 |
| 15 | 1 | 00-10 | 00008 | 1MB | 001-0005093 |
| 16 | 1 | 00-10 | 00009 | 1MB | 001-0005094 |
| 17 | 1 | 00-10 | 00010 | 1MB | 001-0005095 |

Figure 10

| Journal Group # ⌒133 | Used Capacity ⌒501 | SJVOL ⌒138 Capacity ⌒502 |
|---|---|---|
| 1 | 0 | 3000 |
| 2 | 0 | 2000 |
| 3 | 0 | 3000 |

Figure 12

| Journal Group # | Check Flag | Last Register Sequence Number of Journal |
|---|---|---|
| 1 | 0 | 001-0005085 |
| 2 | 0 | 002-0000389 |
| 3 | 0 | 003-0000048 |

Figure 13

USING BANDWIDTH AND CAPACITY PARAMETERS TO CONTROL REMOTE COPY OPERATIONS IN STORAGE SYSTEMS

BACKGROUND OF THE INVENTION

This invention relates to storage systems, and in particular to providing assured levels of quality of service for data protection in such systems.

Large organizations throughout the world now are involved in millions of transactions which include enormous amounts of text, video, graphical and audio information which is categorized, stored, accessed and transferred every day. The volume of such information continues to grow. One technique for managing such massive amounts of information is the use of storage systems. Conventional storage systems can include large numbers of disk drives operating under various control mechanisms to record, mirror, remotely back up, and reproduce this data. This rapidly growing amount of data requires most companies to manage the data carefully with their information technology systems.

One common occurrence in management of such data is the need to provide copies of data as protection in case of failure of the storage system. Copies of the data are sometimes made within the storage system itself, in an operation conventionally referred to as "mirroring." This can provide reliability in case of component failures. Copies of the data are also frequently made and stored in remote locations by using remote copy operations. The storage of this data in a remote location provides protection of the data in the event of failures in the primary storage system, or natural disasters occurring in the location of the primary storage system. In such circumstances, the data from the remote copy operation can be retrieved from the secondary storage system and replicated for use by the organization, thereby preventing data loss.

Users have many different kinds of data, and the value of the data to the organization is different as well. It would be desirable to have the level of Quality of Service (QoS) for the data protection to be different depending upon the value of the data to reduce the total cost of operations. In such systems, one measure of the QoS level is known as the Recovery Point Objective (RPO). The RPO generally specifies a range of data loss, for example, with high value data associated with minimum data loss and low value data being tolerant of greater loss.

One technique for providing remote copy operations in a storage system is described in commonly assigned "Data Processing System Including Storage Systems," U.S. application Ser. No. 10/603,076, filed Jun. 23, 2003. Another commonly owned U.S. application Ser. No. 10/022,306, filed Jun. 19, 2003, entitled: "Remote Storage System and Method" describes a system in which data with the highest priority is always copied to the remote site based on that priority.

U.S. Pat. No. 6,487,562 describes a remote copy operation in which a formula of delay time for data with different priority to be copied is employed. The system described there provides copying based upon each track of particular volumes, not based on journal information. In this invention, the remote copy is based upon the copy rate and the journal data, not based upon delay time, tracks or volumes.

One issue which arises in such systems is that the storage system can copy data based on a priority to the remote site. Data with high priority can be copied to the remote site more quickly, and data with lower priority copied later. As a result, data with a lower priority may not be copied to the remote site for a long time depending upon the quantity of data and the bandwidth available. Thus, in some circumstances, depending upon the bandwidth of the copy operation and the extent of high value data, the lower priority data may not be copied to the remote location. What is needed is a system for enabling copying of the data from a primary storage location to a remote location using different levels of priority or different quality of service.

BRIEF SUMMARY OF THE INVENTION

This invention provides storage of journal data to a remote site from a primary site using a different priority than the priority at the primary site, depending upon the user's desired quality of service. In one implementation, the primary storage system stores information for updating data stored on the primary disk array in the form of a history of updates made to the data known as a journal. The journal includes a copy of the data used for updating the data, and typically also includes metadata, specifying address information, data length and other administrative functions. The primary storage system is configured to transfer this journal information to the secondary storage system. In response, the secondary storage system updates the data stored in its memory, typically provided by an array of hard disk drives. The secondary storage system, however, writes the journal data using a priority dependent upon the user's desired quality of service.

The user can specify the quality of service desired using a variety of measures, for example, a recovery point objective or a recovery time objective. In response, a copy manager within one of the storage systems determines the capacity of the various primary and secondary volumes, and determines the copy rate available. The copy manager then copies journal data to the remote site where it can be written into the disk array.

A storage system has a primary storage system and a second storage system. The primary system creates a record of the changes made to the data stored on the primary system. This record of changes is sent to the secondary storage system and recorded there. It is then again stored, but using a write order depending upon the priority specified by the user of the system.

BRIEF DESCRIPTION OF THE DRAWINGS

FIGS. 3a and 3b illustrate a configuration table;

FIG. 4 illustrates a configuration table for a journal group;

FIG. 5 illustrates a capacity table;

FIG. 6 illustrates a copy rate and capacity rate table;

FIGS. 7 and 7a illustrate a table of default values;

FIG. 8 illustrates a table of copy rates;

FIGS. 9, 9a and 9b illustrate tables of capacity per cycle;

FIG. 10 illustrates a table of journal sequence numbers;

FIG. 12 is illustrates another capacity table;

FIG. 13 illustrates a journal check table; and

DETAILED DESCRIPTION OF THE INVENTION

In a typical storage system, users will have many different kinds and types of data stored of a variety of values. A level of Quality of Service (QoS) for the protection of various user data can be chosen to depend upon the value of the data based upon the user's desired QoS. For example, the user may desire to minimize the total cost of operation based upon a Recovery Point Objective (RPO) or a Recovery Time Objective (RTO). A RPO is a measure of the time between data protection events. This measure translates into the amount of data which is at risk of being lost, for example because it is new data which has been generated since the last remote copy operation. Thus, if a copy operation is performed every five minutes, the user data for the last five minutes can be lost if the system fails. An RTO is a measure of how long it takes a user to recover from an event causing loss of data. In other words, it is a measure of the amount of time required to "return to service" reflecting the extent to which the system data is unavailable or inaccessible and thereby prevents normal operations.

According to an embodiment of this invention, the QoS level is divided into five classes, with priority 1 being the highest and priority 5 being the lowest. This division into classes is somewhat arbitrary, and more or fewer classes can be used. In the preferred embodiment, however, the priorities are set as shown below.

Priority 1: Data is mission critical business information
Priority 2: Data is vital business information
Priority 3: Data is important business information
Priority 4: Data is important for business productivity
Priority 5: Data is not important to continued business operations Clearly, data of high value, for example priority 1, requires a minimum data loss, while data of low value does not require a minimum data loss compared to that of the high value. In a typical storage area network approach, the system administrator replicates data from the primary site at a remote site, thereby enabling recovery from a disaster. Thus, the user is able to continue its business at the remote site, even if the primary site is taken out of service due to an unexpected event.

Figure 1:
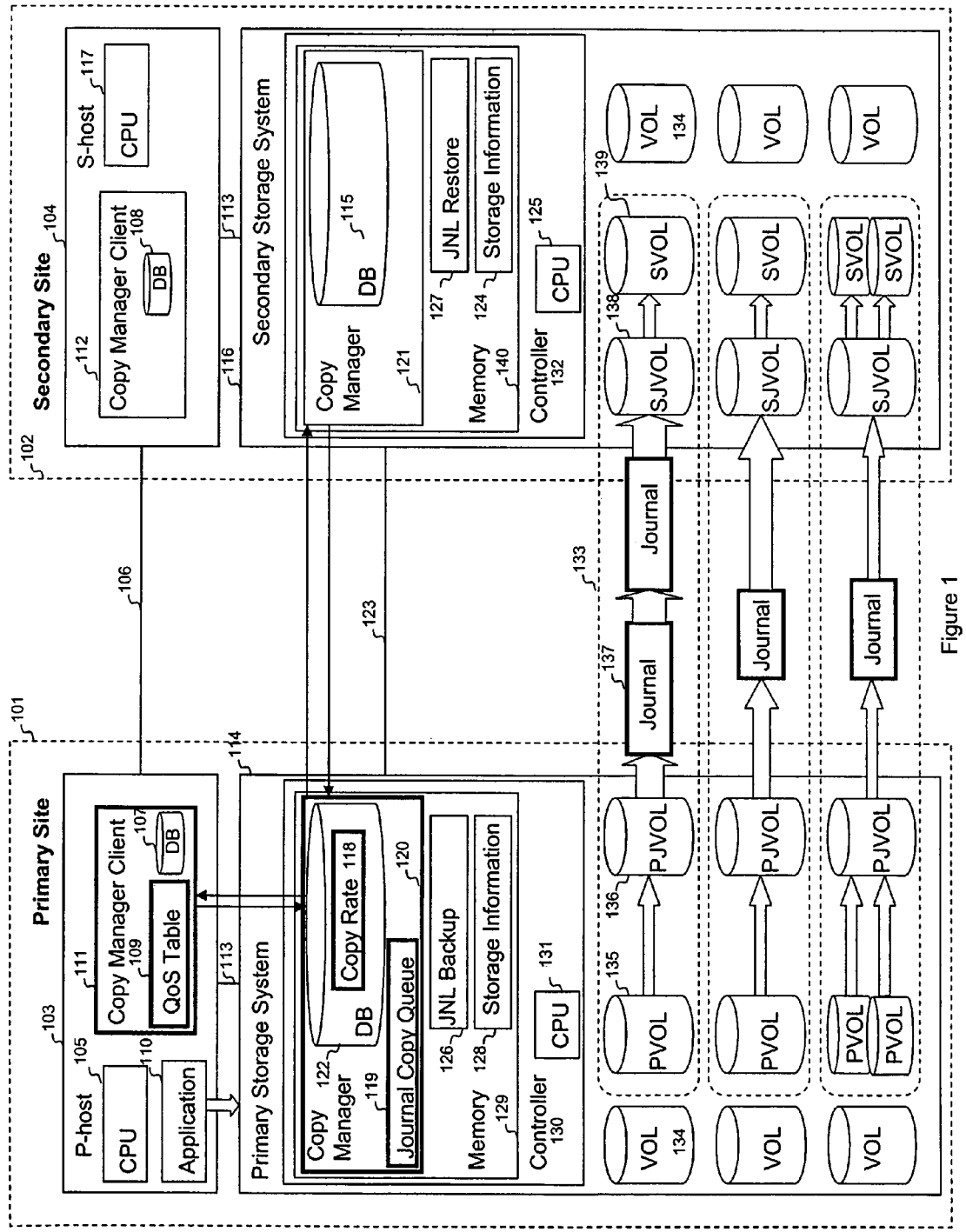
FIG. 1 is a block diagram illustrating an overall system configuration of primary and secondary storage sites.

FIG. 1 is a block diagram illustrating a typical system configuration as implemented according to this invention. As shown by FIG. 1, two storage systems are provided, one at a primary site 101 and one at a second site 102. Of course, additional sites may be added if desired. Typically the primary site 101 will correspond to a main data center for a corporation or a large organization, while the secondary site is provided for the purpose of disaster recovery. The secondary site is usually located remotely from the first site, so that a natural disaster, wide area power failure, or some other event does not impact both sites. Of course, the secondary site can be located within close proximity to the primary site if desired.

In the primary site, a host 103, typically a server, includes a CPU 105, application software 110, and a copy manager client 111. The host 103 is connected to the primary storage system 114 via a communications link 113, and is connected to the host 104 at the secondary site using a communications link 106. The application software 110 and the copy manager client 111 in the primary site are typically stored in memory or on magnetic disks within the primary host 103. The CPU 105 executes the application software 110 and the copy manager client 111. At the secondary site, the CPU 117 within host 104 executes the copy manager client 112.

The application 110 is software for controlling data storage in the primary storage system 114. The application 110 typically controls the writing of data to the various storage volumes within the primary site, as will be discussed further below.

The copy manager client 111 includes a QoS table 109 and a database 107. The copy manager client 111 at the primary site 101 communicates with the copy manager client 112 at the secondary site 102. In one embodiment a user can control the copy manager client 111 via a local area network coupled to the primary site, for example using a web browser or other software on the user's computer. Typically, the user will be a professional administrator who manages overall operations of the storage systems for the corporation or organization.

In FIG. 1 the primary storage system 114 includes a controller 130 and logical storage volume 134. The logical volume has associated with it primary volume 135, and primary journal volume 136. The application 110 will write data to the primary volume 135. The secondary storage system 116 includes a controller 132, volume 134, secondary volume 139, and secondary journal volume 138. These volumes and the associated communication links provide a remote copy capability between the primary site and the secondary site, as discussed below. Importantly, the QoS is prioritized by the data in the table 109, as also discussed below.

Database 107 is associated with the copy manager client 111. This database maintains various configuration tables which control the overall operation of the storage systems. In a similar manner, database 108 associated with the secondary storage system maintains tables controlling the operation of that system.

The primary storage system also includes a copy manager 120. The copy manager includes a journal copy queue 119 and a database 122. This copy manager 120 communicates with the copy manager client 111 in the host, and with the copy manager 121 in the secondary storage system. A copy manager 120 copies journaled data from the primary site to the secondary site using the journal copy queue 119.

Within the secondary site, the copy manager 121 includes a database 115. Copy manager 121 can issue journal read commands to copy manager 120 to provide journal copying operations. Manager 121 communicates with client 112 and manager 120. In a similar manner, copy manager 121 in the secondary site has a database 115 which stores various configuration and capacity tables therein.

Within the primary storage system, controller 130 executes the copy manager 120 and the journal backup 126. It also processes input/output operations from host 103. In a similar manner, the controller 132 in the second storage system executes copy manager 121 and journal restore 127.

The controllers in the primary and secondary systems interact with storage volumes usually provided in an array of hard disk drives, for example, in a RAID configuration, to provide high reliability. Across the bottom portion of FIG. 1, the disk arrays for both the primary and secondary sites are illustrated. Within the primary site, volume 134 is illustrated and is a logical volume. Volume 134 represents the many physical volumes located within dashed line 133 on the primary host. Primary volume 135 receives writes from the host, while volume 136 provides journal data. As mentioned above, the journal data can be thought of as a list of commands and associated data for that command which cause changes in state of the storage volume as those commands are executed. Journal volume 136 takes journals from the write data or the initial copy data of the volume 135 and saves them, at least temporarily, in volume 136. CPU 131 executes copy manager 120 and journal backup 126, while CPU 125 executes copy manager 121 and journal restore 127.

The journal copy queue 119 in copy manager 120 stores information about the volume 136, including the rate at which information may be copied to that disk drive. The copy manager 120 copies journals to the secondary volume 138 using the journal copy queue 119. Database 122 maintains a variety of tables associated with these operation as will be discussed below.

The journal backup program 126 is executed by controller 130. This program takes journals from the write data or the initial copy data of volume 135. The journals are saved to volume 136 temporarily. The journal restore program 127 at the secondary site is executed by controller 132, and it applies the journals to volume 139 from volume 138 to restored the data.

Within the disk array on the secondary side, secondary volume 139 is a replication of primary volume 135. The method of copying from volume 135 to volume 139 is that write data for volume 135 is saved to the volume 136 in a journal form by the journal backup program 126. The copy manager 120 then copies the primary journal to the secondary journal volume 138. The journal restore program 127 then applies the journal to the secondary volume 139 to restore the data. Upon completion of the process, the secondary volume 139 will be same as the primary volume 135.

In general, dashed line 133 encircles a journal group. Upon completion of all copying operations, the data of the primary volume and the secondary volume will be consistent. The primary site and the secondary site are linked by the journal concept 137 shown between the primary and secondary storage systems. The journal consists of journal data and metadata. The journal data is the same as the write data from the primary host 103. The metadata will preferably include the time of write, the address for the write data in volume 135, the address for the data in volume 136, and the data length. The storage information 128 in the primary site and 124 in the secondary site will typically include information about the actual physical location at which the data is stored, the capacity of that location, the extent the capacity has been used, the port for accessing it, etc. As shown in the figures, this information resides within the memory 129, 140 of the storage systems.

The links 106, 113 and 123 among the storage system components and between the storage systems themselves are typically fibre channel or Ethernet links.

The primary storage system database 122 also includes information about copy rates 118. This is discussed further below, but in general is information about the ratio of copies per cycle for each priority. (The priorities were discussed above.) The copy manager 120 determines the number of journals to copy per cycle using the capacity corresponding to the information in this table. In effect, the copy rate assures a minimum bandwidth for each journal group 133. The copy rate for the three journal groups can be viewed as A+B+C, with a copy rate for journal group A being the rate for group A divided by the sum of the rates for all three groups. By multiplying the copy rate by the capacity of copying per cycle, information is provided with respect to the maximum capacity per cycle of copying for the system. Particular copy rates are discussed below.

Figure 2:
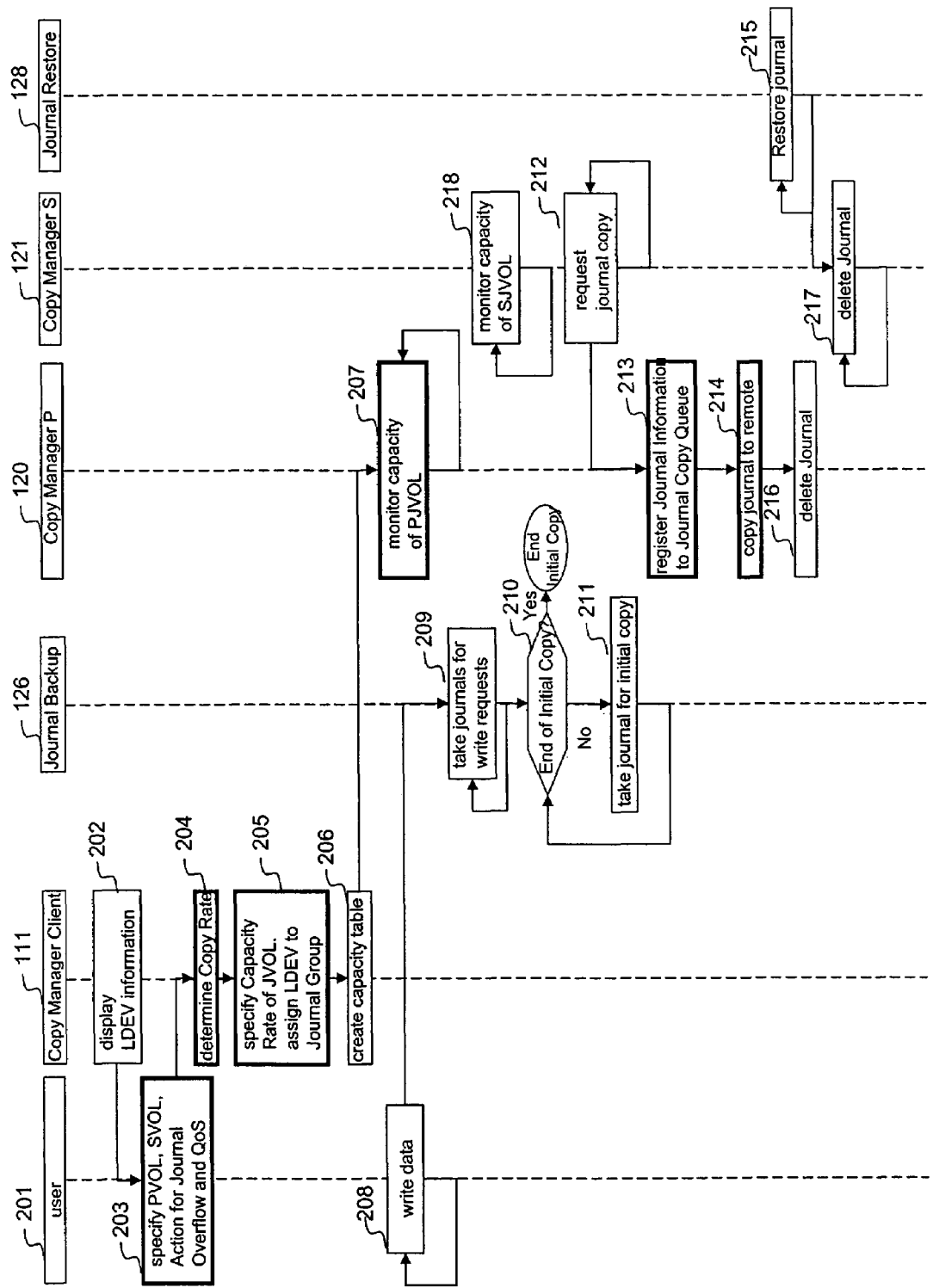
FIG. 2 is a flowchart showing an overall implementation of a preferred embodiment.

FIG. 2 is a flowchart showing an overview of the operation of the system depicted in FIG. 1 in a remote copy operation. The columns in FIG. 2 are labeled to show the entity performing the particular step, and include a diagrammatic representation of the step performed by that particular portion of the system. The operation begins with the copy manager client 111 obtaining the LDEV information from the storage information 128 at the primary site, and similar storage information 124 from the secondary site. Generally, logical devices within a storage system are assigned LDEV numbers. These numbers, from the perspective of the disk controller uniquely identify each of the volumes in the storage system.

FIG. 3a is a table which illustrates LDEV numbers associated with particular storage volumes, as well as associated information about those volumes. In FIG. 3a the capacity 303 is the capacity of that particular logical volume, port 304 is a port name to which that LDEV is mapped, and the "in use" flag 305 indicates whether that LDEV is in use or not. The used capacity column 306 indicates what portion of the capacity of that LDEV has already been used by previous operations. The copy manager client 111 displays (step 202) this information to the user 201. (FIG. 3b shows this same table at a later time, as discussed further below.)

Returning to FIG. 2, at step 203 the user specifies the particular volumes to be used in the operation from the LDEV information. The specification, for example with reference to FIG. 1, would be of volumes 135 and 139. In response to that action, the copy manager 111 will provide the data to a table such as that depicted in FIG. 4 which illustrates the configuration of a journal group and the action to be taken in case of journal overflow. In FIG. 4 note that pair column 401 specifies the pairing of the volumes 135 and 139, while the user specifies the journal group 133. If the user specifies that all three of the pairs in journal group 1 are to be used, then the copy manager client 111 assigns one of them for journal group 133 from the pair of pairs 1, 2 and 3. The user can also specify "on" as the action for journal overflow, as shown by column 402 in FIG. 4, and specify the threshold of remaining capacity for journal overflow as shown in column 403. The user can also specify the scale of copy rate 404 and the come back threshold of volume 136, as shown by column 405 in FIG. 4. The action for journal overflow being on means that the copy manager 120 will increase the copy rate 118 by the scale 404 automatically if the free space in volume 136 becomes less than the threshold value 403. This enables more efficient use of the volumes.

Setting the action for journal overflow 402 to off means that when the volume 136 is full, or nearly full, the write data operations will be delayed when host 103 writes data. This may trigger need for increased space, in which case pairs 2 and 3 will be added to journal group 1. The comeback threshold 405 defines when copy manager 120 replaces copy rate 404 with the original copy rate 404 if the capacity of volume 138 is less than the threshold.

Client 111 shows the QoS 604 using table 109. (QoS 604 is included in the entries in the table shown in FIG. 6.) The value of the RPO 605 and RTO 606 is a reference value used to prioritize the data. This allows the user to have finer control among the various data priorities set to more clearly define their relative importance. Once this data is set, the copy manager 111 completes the table shown in FIG. 3a with the information shown in FIG. 3b. As shown there, the LDEV ID and journal group assignments are completed.

Returning to FIG. 2, at step 204 the copy manager client 111 determines the rate 118 for the journal group 133 based on the QoS 604 which the user selected. The copy rate table in FIG. 6 is used for this purpose. As shown there, the user selection of the various priorities and associated RPO and RTO values results in the system determining the copy rate 118. The client also determines the maximum capacity per cycle 701 based upon the priority 601 and copy rates, as shown in FIG. 7. Then, using that data, the client creates a table as shown in FIG. 8. The values shown in FIG. 7 are default values stored in database 122, while those in FIG. 8 reflect the user's settings.

Next, at step 205 in FIG. 2, the copy manager client 111 determines the capacity rate for the particular volume. The capacity rate 603 (see FIG. 6) for journal volume 603 is the capacity rate for volume 136 and volume 138. As illustrated in FIG. 5, the capacity rate for volume 136 of group 1 is 3000 GB, while that of journal group 2 is 2000 GB. The user or the copy manager client 111 can assign a fixed capacity independently of the capacity rate, if that is desired. Once this is completed, the client 111 creates the table in FIG. 3b, using the information from FIG. 3a. The resulting table is stored in databases 107, 122, 108, and 115. The table shown in FIG. 4 is stored in databases 107 and 122.

Next, returning to FIG. 2, the capacity table is created at step 206. A sample capacity table is shown in FIG. 5, and this can be used for overflow monitoring or capacity monitoring in conjunction with the tables of FIGS. 3 and 4. As the system operates, the copy manager 120 will periodically update the table shown in FIG. 5 to reflect the capacity which has been used. As shown in FIG. 5, the used capacity 501 and total capacity 502 reflect the availability of volume 136. This table is stored in database 122. Client 111 also creates the capacity table shown in FIG. 12 used for overflow monitoring of volume 138, and periodically updates this table as well.

Returning to FIG. 2, at step 207 the copy manager 120 begins capacity monitoring of volume 136 by periodically checking the table shown in FIG. 5. If the capacity of volume 136 becomes less than the threshold 403 set in FIG. 4, copy manager 120 will change the copy rate 118 according to FIG. 4. Then the copy manager 120 gives the journal group 133 priority to copy data as shown in step 208. At this step data is written from the application 110 to each volume 135. At step 209 the journal backup 126 receives journals for each write request after the user has created the journal group 133. The backup 126 checks whether the initial copy is ended, at decision step 210. If it is not, it takes a journal for the initial copy as shown by step 211 and repeats the process. Meanwhile, the capacity of volume 138 is being monitored, as shown at step 218. It is monitored by periodic checks of the table shown in FIG. 12. Once the volume is almost full, the copy manager 121 will not issue commands to manager 120. The desired extent of capacity, and the timing of triggering this action is controlled by a set value within copy manager 121.

At step 212 the copy manager 121 requests copying the journal data. Manager 121 periodically sends these copy requests with journal restore information. The journal restore information consists of the last copy sequence number of the journal which has already been copied from volume 136 to volume 138, and the last restore sequence number of a journal which has been restored from volume 138 to volume 139. The last copy sequence number is used to determine the journal that the copy manager should copy. Similarly, the last restore sequence number is used to determine the journal that the copy manager 120 should delete.

At step 213 copy manager 120 registers the journal information to the copy queue 119. This information includes the journal group 133, the LDEV ID (302 of the volume 136, as well as additional information. A sample table illustrating this information is shown as FIG. 10. As illustrated there, for queue number 1 (in queue field 1001), the journal group is number 1, the LDEV ID is 00-10, and the information also includes the address of the metadata 1003, the capacity of the journal 1004, and a journal sequence number 1005. This specific operation is associated with step 213 in FIG. 2 in which the journal information as registered to the copy queue, and will be discussed in conjunction with FIG. 11.

Following this operation the journal is copied to the remote as shown by step 214. At this step the copy manager 120 copies the journals in the order of the copy queue. As the journals are copied, they are removed from the queue. As this is occurring, restore operations in the secondary site, as shown by step 215 in FIG. 2, occur. The restore operations restore the journal to volume 139 from volume 138. The restore operation checks the journals which have not been restored, and if there are any, the system then applies the data to volume 139 to restore it to match volume 135. As shown at step 216 and 217, delete the journals that have been copied, as well as those that have been restored. This process continues until all have been copied and all have been restored.

Figure 11:
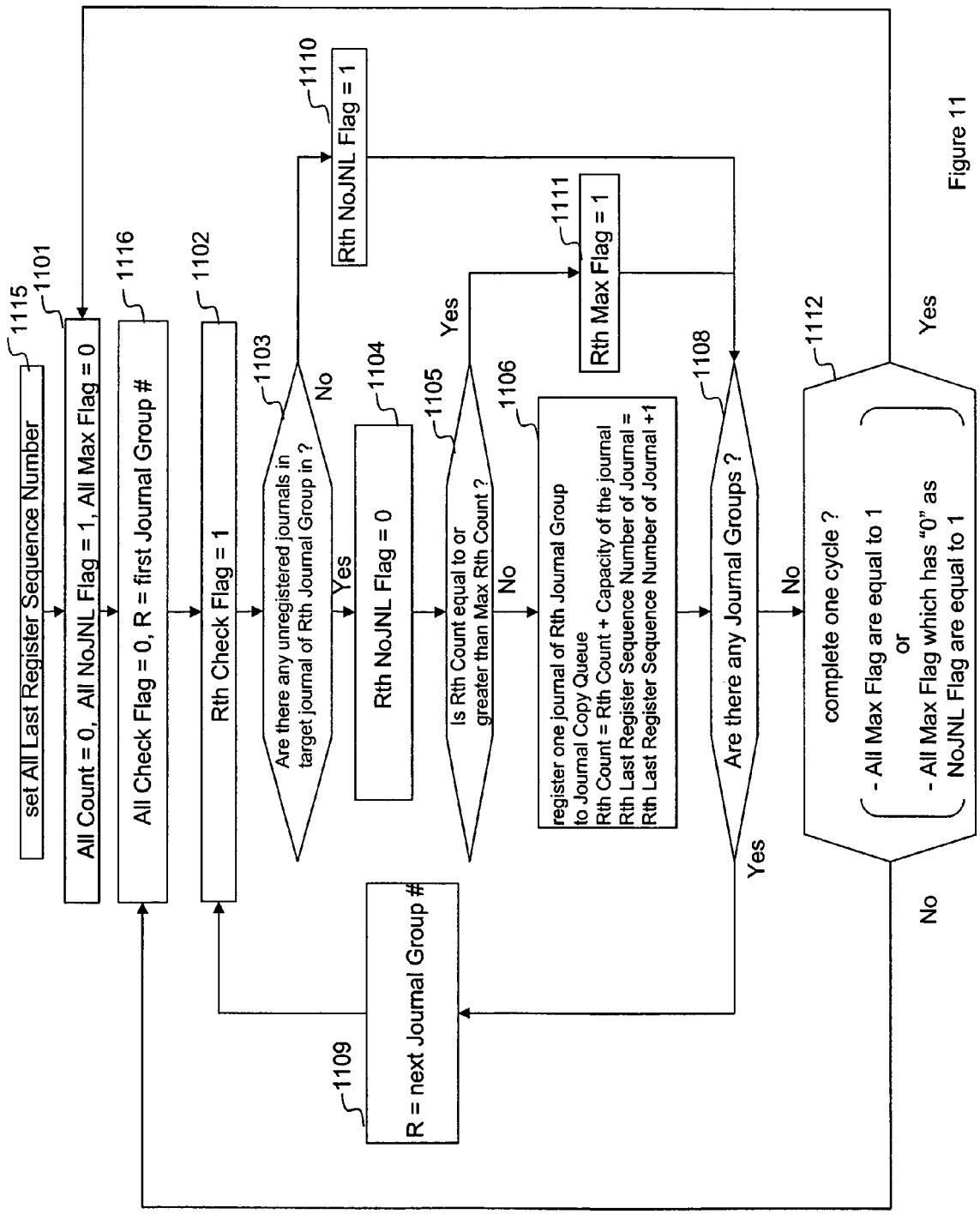
FIGS. 11 and 11a are flowcharts illustrating how a copy manager registers information in a queue.

FIG. 11 is a more detailed flowchart illustrating how copy manager 120 registers journal information to the copy queue 119. In the first step 1115, the copy manager 120 sets the last register sequence number of journal 1302 (see FIG. 13) sent by copy manager 121. Next, at step 1101, the copy manager sets all counts to 0. The count is the capacity of the journal that will be copied in one cycle. The flag shown in block 1101 means a flag indicating whether there are journals of a journal group 133. The copy manager sets all of the flags to 1. This means there are no journals within journal group 133. A 0 would mean that there are some journals. The maximum flag indicates a flag about whether the count exceeds the maximum capacity per 1 cycle as set and shown in FIG. 7.

Next, at step 1116 copy manager 120 sets the check flag (1301 in FIG. 13) to 0 and sets R to be the first journal group number which has target journals for a journal read command. Then at step 1102 the copy manager sets the check flag to 1, and the process moves to step 1103. At that step the copy manager 120 checks whether there are unregistered target journals of the Rth journal group. If there are, the system transitions to step 1104, and if not to step 1110. At step 1104 the copy manager sets the flag to 0, and at step 1105 a determination is made whether the Rth count is equal to or greater than the max count. If it is, the system moves to step 1111 and if not to step 1106. At step 1106 a number of actions take place in which one journal of the group is registered to the copy queue 119, and the count is set to the count plus the capacity of the journal. The copy manager also increments the last register sequence number of the journal by 1, and then at step 1108 checks whether there are any remaining groups. If there are remaining groups, the process flow from step 1102 to step 1108 is repeated. If there are not, then as indicated at step 1112 a check is made as to whether the cycle is completed. If it is completed, the system reverts to step 1101. If not, the system moves to step 1102.

This invention can also be applied to a circumstance in which three or more data centers are employed. In such a configuration each site which copies the journal needs to have primary site functionality as described herein. In this implementation, for example, in FIG. 11, the $S_{th}$ journal group can use $S_{th}$ max count and $R^{th}$ max count instead of $R^{th}$ journal group which has NoJNL=1 and Max Flag=0. The copy manager client 111 can determine a copy rate for journal group A that is the I/O rate of group A divided by the sum of the I/O rates of all three groups. The copy manager client 111 also can determine a copy rate for journal group A that the capacity of JPVOL 136 for group A is divided by the sum of the JPVOL 136 for all three groups. This allows the copy rate 118 to be changed dynamically.

FIG. 9 is a copy rate monitoring table by capacity which is stored in database 122. It illustrates the operations of FIG. 11. Assume that:

PJVOL 136 of Journal Group 1 has 10 journals from 001-0005086 to 001-0005095, and the capacity of a journal is 1 MB PJVOL 136 of Journal Group 2 has 30 journals from 002-0000390 to 002-0000419, and the capacity of a journal is 1.5 MB.

PJVOL 136 of Journal Group 3 has 5 journals from 003-0000049 to 003-0000053, and the capacity of a journal is 240 KB.

The target journals are the journal that copy manager 121 requests to copy to SJVOL 138 by the Journal Read Command. Assume:

Target journals of Journal Group 1 are from 001-0005086 to 001-0005095.

Target journals of Journal Group 2 are from 002-0000390 to 002-0000410.

Target journals of Journal Group 3 are from 003-0000049 to 003-0000054.

And assume the maximum capacity per cycle 701 of Journal Group 1 is 30 MB, of journal group 2 is 3 MB, and of journal group 3 is 1200 KB.

For this case, the process of FIG. 11 will operate as follows:

Step 1115: Copy manager 120 sets the last register sequence number for journal group 1 to 001-0005085, the last register sequence number for journal group 2 to 002-0000389 and the last register sequence number for journal group 3 to 003-0000048.

Step 1101: Copy manager 120 sets all count and max flag to 0, and all NoJNL to 1.

Step 1116: Copy manager 120 sets the all check flag to 0, R to 1.

Step 1102: Copy manager 120 sets 1st check flag to 1.

Step 1103: SJVOL 138 of journal group 1 has from 001-0005086 to 001-0005095. The target journals of journal group 1 are from 001-0005086 to 001-0005095. The last register sequence number for journal group 1 is 001-0005085. There are unregistered target journals in SJVOL 138. Therefore, yes. Go to step 1104. The loop of steps 1103 to 1108 process each journal group 133 which has a target journal.

Step 1104: Copy manager 120 sets 1st NoJNL to 0.

Step 1105: The 1st count is 0, the 1st max count is 30 MB, the 1st count is less than 1st max count, therefore, No. Go to step 1106.

Step 1106: Copy manager 120 registers 001-0005086 to journal copy queue 119. The copy manager 120 sets 1st count to 1 MB. The current capacity per cycle 901 of journal group 1 is 1 MB. The copy manager 120 sets last register sequence number of journal for journal group 1 to 001-0005086.

Step 1108: copy manager 120 checks all check flag. 1st check flag is 1. 2nd and 3rd check flag are 0. copy manager 120 checks whether journal group 2 and 3 have target journals. journal group 2 and 3 have target journals. therefore, yes. go to Step 1109.

Step 1109: copy manager 120 sets R to 2.

Step 1102: copy manager 120 sets 2nd check flag to 1.

Step 1103: SJVOL 138 of journal group 2 has from 002-0000390 to 002-0000419. The target journals of journal group 2 are from 002-0000390 to 002-0000410. The last register sequence number for journal group 2 is 002-0000389. There are unregistered target journals in SJVOL 138. Therefore, yes. Go to step 1104.

Step 1104: The copy manager 120 sets 2nd NoJNL to 0.

Step 1105: The 2nd count is 0. The 2nd max count is 3 MB. The 2nd count is less than 2nd max count, therefore, no. Go to step 1106.

Step 1106: The copy manager 120 registers 002-0000390 to journal copy queue 119. The copy manager 120 sets 2nd count to 1.5 MB. The current capacity per one cycle 901 of journal group 2 is 1.5 MB. The copy manager 120 sets last register sequence number for journal group 2 to 002-0000390.

Step 1108: The 1st and 2nd check flag are 1, the 3rd check flag is 0. The copy manager 120 checks whether journal group 3 has target journals. Journal group 3 has target journals, therefore, yes. Go to step 1109.

Step 1109: Copy manager 120 sets R to 3.

Step 1102: Copy manager 120 sets 3rd check flag to 1.

Step 1103: SJVOL 138 of journal group 3 has from 003-0000049 to 003-0000053. The target journals of journal group 3 are from 003-0000049 to 003-0000054. The last register sequence number for journal group 3 to 003-0000048. There are unregistered target journals in SJVOL 138, therefore, yes. Go to step 1104.

Step 1104: Copy manager 120 sets 3rd NoJNL to 0.

Step 1105: The 3rd count is 0. The 3rd max count is 1200 KB. The 3rd count is less than 3rd max count. Therefore, no. Go to step 1106.

Step 1106: The copy manager 120 registers 003-0000049 to journal copy queue 119. The copy manager 120 sets 3rd count to 240 KB. The current capacity per cycle 901 of journal group 3 is 240 KB. The copy manager 120 sets the last register sequence number for journal group 3 to 003-0000049.

Step 1108: The 1st, 2nd and 3rd check flag are 1. There is no journal group which has target journals in this loop, therefore, no. Go to step 1112.

Step 1112: The 1st, 2nd and 3rd max flags are 0. Therefore, one cycle is not done. Go to step 1102.

Step 1102: The copy manager 120 sets R to 1. Then, 001-0005087, 002-0000391, 0003-0000050 and 001-0005088 are registered to journal copy queue 119.

Step 1105: R=2, and the 2nd count is 3 MB. The 2nd max count is 3 MB. The 2nd count is equal to 2nd max count. Therefore, yes. Go to step 1106.

Step 1111: The copy manager 120 sets 2nd max flag=1. In this cycle, the journal of journal group 2 is not registered after this step. Then, from 003-0000050 to 001-0005091 are registered to journal copy queue 119.

Step 1103: R=3, and SJVOL 138 of journal group 3 has from 003-0000049 to 003-0000053.

The target journals of journal group 3 are from 003-0000049 to 003-0000054. The last register sequence number for journal group 3 is 003-0000054. There are no unregistered target journals in SJVOL 138. Therefore, no. Go to step 1110.

Step 1110: The copy manager 120 sets 3rd NOJNL to 1. In this cycle, journal group 3 is not registered after this step.

Figure 11A:
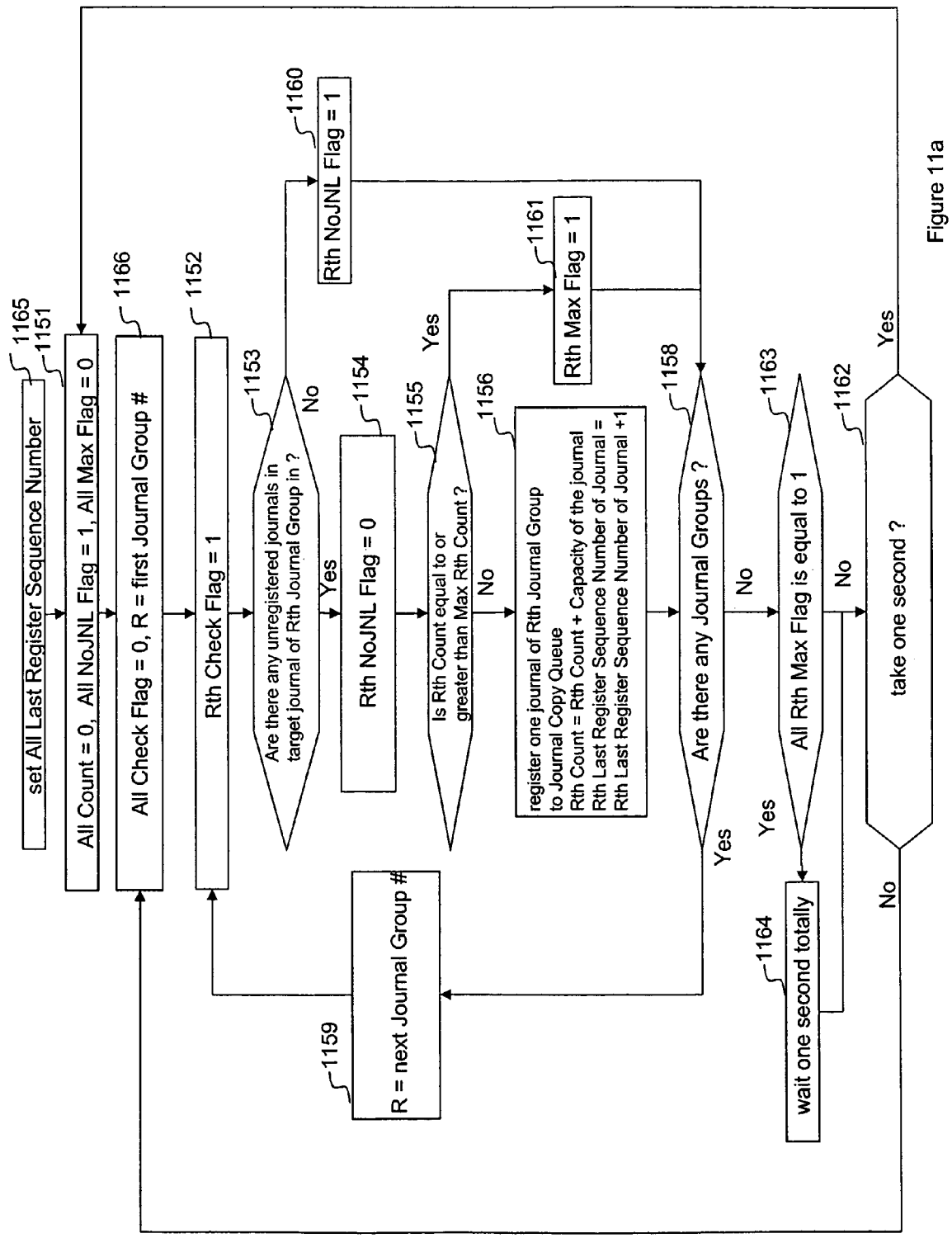

FIG. 11a illustrates another embodiment of the invention. In FIG. 11a, the copy manager 120 uses the maximum capacity per second 751 instead of the maximum capacity per cycle. The per cycle information is shown in FIG. 7 and the per second information is shown in FIG. 7a. In FIG. 7a the default value per second shows the capacity per second for the copy manager to copy journal groups. In other words, the capacity per second 751 is the maximum bandwidth for each journal group. The process illustrated in FIG. 11a then relies upon this data at steps 1162 and 1163. At step 1163 there is a cycle to include step 1164 of waiting one second, and then at step 1162 the copy manager 120 checks whether one second was required, and then transitions back to an earlier step in the flowchart, depending upon the result. In another approach, in lieu of copy rate information, the copy managers can use input/output rates for each journal group, or the journal capacity of volume 136.

Figure 14:
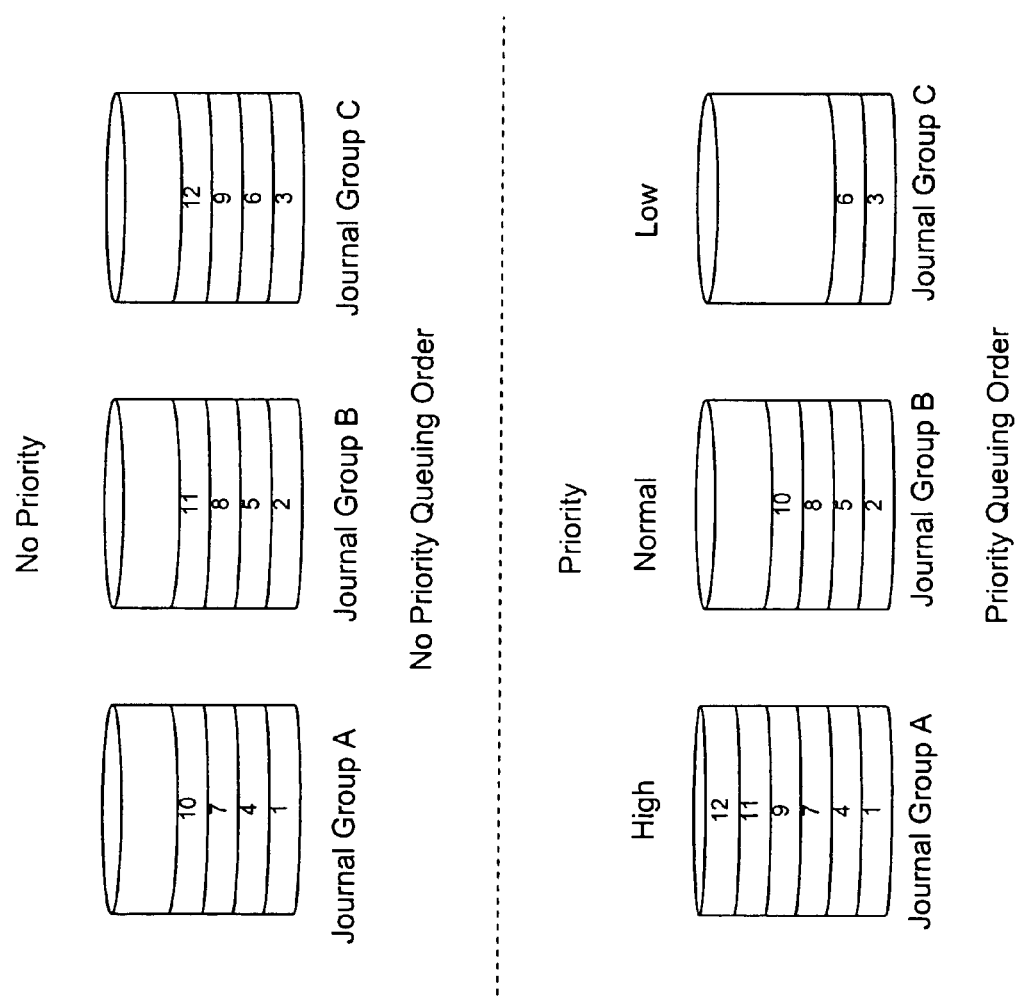
FIG. 14 illustrates two queuing orders for different priorities.

FIG. 14 is a diagram which illustrates the use of priorities in recording of journal data. The upper portion of the figure illustrates queuing when there is no priority specified. In this case, the copy manager 120 will copy one journal of each journal group 133 in the order in which they are found within group 133. Thus, the first step will copy information from journal group A, then from B, then from C, then from A again, B again, etc. In contrast, assume that journal group A has higher priority than group B which has higher priority than group C. The result will be as shown in the lower portion of FIG. 14 in which the copying operation in rearranged to give priority to the highest priority data.

The preceding has been a description of preferred embodiments of the invention. It will be appreciated that numerous variations may be made within the invention without departing from the scope of the invention, as set forth by the appended claims.

What is claimed is:

1. In a storage system having a primary storage system and a secondary storage system, a method of providing a copy comprising:
   recording data in the primary storage system;
   at the primary storage system, storing a record of changes made during the step of recording data in the primary storage system;
   at the secondary storage system, issuing a request for reading the record of changes made during the step of recording data in the primary storage system;
   sending the record of changes made during the step of recording data in the primary storage system, to the secondary storage system;
   recording the record of changes made during the step of recording data in the primary storage system, at the secondary storage system; and
   using the record of changes made during the step of recording data in the primary storage system to thereby make a copy at the secondary storage system,
   wherein prior to the step of recording data in the primary storage system steps are performed comprising:
   forming a plurality of journal groups, each journal group including at least one pair of a primary volume from the primary storage system and a secondary volume from the secondary storage system, each journal group further including a primary journal volume for storage of journal data representing record of changes of the at least one primary volume in the journal group and a secondary journal volume for storage of copies of the journal data stored in the primary journal volume, each journal group configured to maintain consistency of data between each pair of the at least one pair of primary volume and secondary volume;
   for each of the plurality of journal groups, determining a capacity and a bandwidth for the primary and secondary journal volumes in said each journal group based on a designated quality of service parameter at a level designated for said each journal group; and
   for each of the plurality of journal groups, determining a maximum capacity rate for the primary and secondary journal volumes in said each journal group based on the bandwidth and the designated quality of service parameter for said each journal group.

2. A method as in claim 1 further comprising specifying a level of quality of service for the step of recording the record of changes made during the step of recording data in the primary storage system, at the secondary storage system.

3. A method as in claim 2 wherein the step of specifying a level of quality of service comprises assigning priorities to different types of data and using those priorities in the step of using the record of changes made during the step of recording data in the primary storage system to thereby make a copy at the secondary storage system.

4. A method as in claim 3 where prior to the step of at the primary storage system, storing a record of changes made during the step of recording data in the primary storage system, a step is performed to determine the available bandwidth at the primary storage system.

5. A method as in claim 1 wherein prior to the step of recording data in the primary storage system a determination is made of characteristics of a group of storage volumes in the primary and secondary storage systems.

6. A method as in claim 5 wherein the characteristics include capacity of the storage volumes and a rate at which data may be copied.

7. In a storage system having a primary storage system and a secondary storage system, a method of providing a copy comprising:
   specifying a measure of quality of service;
   forming a plurality of journal groups, each journal group including at least one pair of a primary volume from the primary storage system and a secondary volume from the secondary storage system, each journal group further including a primary journal volume for storage of journal data representing record of changes of the at least one primary volume in the journal group and a secondary journal volume for storage of copies of the journal data stored in the primary journal volume;
   for each of the plurality of journal groups, determining a capacity of the primary and secondary journal volumes in said each journal group based on a designated quality of service parameter at a level designated for said each journal group;
   for each of the plurality of journal groups, determining a bandwidth for copying between the primary journal volume at the primary storage system and the secondary journal volume at the secondary storage system in said each journal group based on the designated quality of service parameter for said each journal group;
   for each of the plurality of journal groups, determining a maximum capacity rate for the primary and secondary journal volumes said each journal group based on the bandwidth and the designated quality of service parameter for said each journal group;
   recording data in the primary storage system;
   preparing a journal of the data recorded in the primary storage system;
   transferring the journal of the data recorded in the primary storage system to the secondary storage system and recording the journal of the data at the secondary storage system; and
   using the journal recorded at the secondary storage system to create at the secondary storage system a copy of the data recorded in the primary storage system.

8. A storage system comprising:
   a primary storage system including a first set of storage volumes for storing data; and
   a secondary storage system including a second set of storage volumes for storing data;
   the primary storage system including
   a first storage for storing information about quality of service for various data to be stored at the primary storage system;
   a second storage for storing information about a journal group of storage volumes including a primary volume and a primary journal volume in the primary storage system and a secondary volume and a secondary journal volume in the secondary storage system, the primary, primary journal, secondary, and secondary journal volumes forming the journal group of storage volumes;

a third storage for storing information about capacity of the journal group of storage volumes;

a fourth storage for storing information about a bandwidth for copying between the primary and secondary volumes and between the primary journal and secondary journal volumes; and wherein data is recorded in the primary volume;

a record of changes made to the primary volume is recorded in the primary journal volume;

the record of changes recorded in the secondary journal volume is transferred to the secondary journal volume and recorded in the secondary journal volume;

the record of changes recorded in the secondary journal volume is used to create in the secondary volume a copy of the data recorded in the primary volume;

wherein the primary and secondary journal volumes have a capacity and a bandwidth determined based on a designated quality of service parameter at a level designated for the journal group; and wherein the primary and secondary journal volumes have a maximum capacity per second and a maximum capacity per cycle determined based on the bandwidth and the designated quality of service parameter for the journal group.

9. In a storage system having a primary storage system and a secondary storage system, the primary storage system being coupled to a first host and the secondary storage system being coupled to a second host, a method of providing a copy comprising:

recording data in the primary storage system by storing the data in a primary volume;

at the primary storage system, storing in a primary journal volume a record of changes made during the step of recording data in the primary storage system;

at the secondary storage system, issuing a request for reading the record of changes made during the step of recording data in the primary storage system;

from the primary journal volume, sending the record of changes made during the step of recording data in the primary storage system, to the secondary storage system using a communications link;

recording the record of changes made during the step of recording data in the primary storage system, at the secondary storage system, the recording being made in a secondary journal volume; and using the record of changes made during the step of recording data in the primary storage system to thereby make a copy in a secondary volume of the secondary storage system, wherein during the step recording the record of changes made during the step of recording data in the primary storage system, at the secondary storage system, the recording being made in a secondary journal volume; a further step of monitoring a capacity of the secondary journal volume is performed;

wherein prior to said recording data in the primary storage system, said method further comprises:

forming a journal group that includes the primary volume, the primary journal volume, the secondary volume, and the secondary journal volume;

determining a capacity and a bandwidth for the primary and secondary journal volumes based on a designated quality of service parameter at a level designated for the journal group; and determining a maximum capacity rate for the primary and secondary journal volumes based on the bandwidth and the designated quality of service parameter for the journal group.

10. A method as in claim 9 wherein following the step of using the record of changes a step of deleting the record of changes is performed.

11. A method as in claim 9 wherein queues are used to control writing of the record of changes in the primary and the secondary journals.

12. A method as in claim 9 wherein during the step of storing in a primary journal volume a record of changes made during the step of recording data in the primary storage system a further step of monitoring capacity of the primary journal volume is performed.

13. In a storage system having a primary storage system and a secondary storage system, a method of providing a copy comprising:

recording data in the primary storage system;

at the primary storage system, storing a record of changes made during the step of recording data in the primary storage system;

at the secondary storage system, issuing a request for reading the record of changes made during the step of recording data in the primary storage system;

sending the record of changes made during the step of recording data in the primary storage system, to the secondary storage system;

recording the record of changes made during the step of recording data in the primary storage system, at the secondary storage system; and using the record of changes made during the step of recording data in the primary storage system to thereby make a copy at the secondary storage system, wherein prior to the step of recording data in the primary storage system said method further comprises:

forming a plurality of journal groups, each journal group including at least one pair of a primary volume from the primary storage system and a secondary volume from the secondary storage system, each journal group further including a primary journal volume for storage of journal data representing record of changes of the at least one primary volume in the journal group and a secondary journal volume for storage of copies of the journal data stored in the primary journal volume;

for each of the plurality of journal groups, determining a capacity and a copy rate for the primary and secondary journal volumes in said each journal group based on a designated quality of service parameter at a level designated for said each journal group; and for each of the plurality of journal groups, determining a maximum capacity rate for the primary and secondary journal volumes in said each journal group based on the copy rate and the designated quality of service parameter for said each journal group.

14. A method as in claim 1 wherein the designated quality of service parameter includes at least one of a recovery time objective (RTO) parameter or a Recovery Point Objective (RPO) parameter.

15. A method as in claim 1 further comprising designating different levels of the quality of service parameter for the plurality of journal groups, so as to provide different maximum capacity rates according to the different levels.

16. A method as in claim 7 further comprising designating different levels of the quality of service parameter for the plurality of journal groups, so as to provide different maximum capacity rates according to the different levels.

17. A storage system as in claim 8 wherein the designated quality of service parameter includes at least one of a recovery time objective (RTO) parameter or a Recovery Point Objective (RPO) parameter.

18. A storage system as in claim 8,
wherein a plurality of journal groups are formed, each journal group including at least one pair of a primary volume from the primary storage system and a secondary volume from the secondary storage system, each journal group further including a primary journal volume from the primary storage system and a secondary journal volume from the secondary storage system; and
wherein different levels of the quality of service parameter are designated for the plurality of journal groups, so as to provide different maximum capacity rates according to the different levels.

19. A method as in claim 9 further comprising:
forming a plurality of journal groups, each journal group including at least one pair of a primary volume from the primary storage system and a secondary volume from the secondary storage system, each journal group further including a primary journal volume for storage of journal data representing record of changes of the at least one primary volume in the journal group and a secondary journal volume for storage of copies of the journal data stored in the primary journal volume; and
designating different levels of the quality of service parameter for the plurality of journal groups, so as to provide different maximum capacity rates according to the different levels.

20. A method as in claim 13 further comprising designating different levels of the quality of service parameter for the plurality of journal groups, so as to provide different maximum capacity rates according to the different levels.

\* \* \* \* \*